United States Patent

Meyer et al.

(10) Patent No.: US 9,539,904 B2
(45) Date of Patent: Jan. 10, 2017

(54) ENERGY CONSUMPTION RATE IN DISTANCE DOMAIN

(71) Applicant: FORD GLOBAL TECHNOLOGIES, LLC, Dearborn, MI (US)

(72) Inventors: Jason Meyer, Canton, MI (US); Sangeetha Sangameswaran, Canton, MI (US); Mathew Alan Boesch, Plymouth, MI (US); Joseph F. Stanek, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 14/320,867

(22) Filed: Jul. 1, 2014

(65) Prior Publication Data

US 2016/0001658 A1 Jan. 7, 2016

(51) Int. Cl.
*B60L 3/12* (2006.01)
*B60L 11/18* (2006.01)
*G07C 5/08* (2006.01)

(52) U.S. Cl.
CPC .............. *B60L 3/12* (2013.01); *B60L 11/1861* (2013.01); *G07C 5/0816* (2013.01); *Y02T 10/7005* (2013.01); *Y10S 903/903* (2013.01)

(58) Field of Classification Search
None
See application file for complete search history.

(56) References Cited

U.S. PATENT DOCUMENTS

| | | | |
|---|---|---|---|
| 3,908,451 A * | 9/1975 | Walker | G01F 9/001 701/123 |
| 7,966,121 B2 * | 6/2011 | Aoyagi | B60L 11/18 180/284 |
| 8,121,802 B2 | 2/2012 | Grider et al. | |
| 8,670,885 B2 | 3/2014 | Gilman et al. | |
| 9,139,095 B2 * | 9/2015 | Kim | B60L 1/003 |
| 2009/0099724 A1 * | 4/2009 | Kranz | G01F 1/115 701/33.4 |
| 2012/0179420 A1 | 7/2012 | Gilman et al. | |
| 2013/0253740 A1 * | 9/2013 | Kim | B60L 1/003 701/22 |
| 2013/0311016 A1 * | 11/2013 | Kim | B60L 11/1862 701/22 |
| 2016/0023554 A1 * | 1/2016 | Tseng | B60L 3/12 701/22 |
| 2016/0093125 A1 * | 3/2016 | Meyer | G07C 5/085 701/33.9 |

* cited by examiner

*Primary Examiner* — Redhwan k Mawari
*Assistant Examiner* — Edward Torchinsky
(74) *Attorney, Agent, or Firm* — David Kelley; Brooks Kushman P.C.

(57) ABSTRACT

A method of controlling a battery electric vehicle includes displaying an energy consumption parameter to a vehicle operator. The energy consumption parameter is based on a filtered energy usage rate. The filtered energy usage rate is defined by a weighted incremental energy consumption rate measured over a first distance and an average energy consumption rate learned over a second distance. The second distance exceeds the first distance.

14 Claims, 4 Drawing Sheets

ENERGY CONSUMPTION RATE IN DISTANCE DOMAIN

TECHNICAL FIELD

The present disclosure relates to calculating an energy consumption rate for a vehicle.

BACKGROUND

A battery electric vehicle (BEV) may be propelled by operation of an electric machine configured to receive electrical power from an on-board battery. The battery may be charged with electrical power from a utility grid or other off-board power source. A BEV driver may wish to accurately know the expected vehicle drive range before the battery is drained.

SUMMARY

A method of controlling a battery electric vehicle according to the present disclosure includes displaying an energy consumption parameter to a vehicle operator. The energy consumption parameter is based on a filtered energy usage rate. The filtered energy usage rate is defined by a weighted incremental energy consumption rate measured over a first distance and an average energy consumption rate learned over a second distance. The second distance exceeds the first distance.

In various embodiments, the filtered energy usage rate may be filtered by a first order discrete filter. The incremental energy consumption rate may be based on a time integral of power consumed over the first distance and a time integral of average vehicle speed over the first distance. Some embodiments additionally include recalculating the energy consumption rate in response to the vehicle traveling a distance exceeding a threshold distance.

A vehicle according to the present disclosure includes a display configured to signal information to a vehicle operator and a controller. The controller is configured to signal a vehicle energy consumption rate via the display. The energy consumption rate is based on a weighted incremental energy consumption rate measured over a first distance and an average energy consumption rate learned over a second distance, where the second distance exceeds the first distance.

Some embodiments additionally include a traction motor configured to provide torque to vehicle traction wheels, and a traction battery configured to supply battery power to the traction motor. In various embodiments, the energy consumption rate may be filtered by a first order discrete filter. The controller may be further configured to recalculate the energy consumption rate in response to the vehicle traveling a distance exceeding a threshold distance, which in some embodiments is 0.1 km.

A method of controlling a vehicle according to the present disclosure includes displaying a vehicle energy usage parameter to a vehicle operator. The energy consumption parameter is based on a first energy consumption value and a second energy consumption value. The first energy usage value corresponds to a weighted incremental energy consumption rate over a first distance and the second energy consumption value corresponds to a stored energy consumption rate over an accumulated distance.

In various embodiments, the energy consumption parameter may be an estimated distance to empty. The energy consumption parameter may be filtered by a first order discrete filter. Some embodiments additionally include recalculating the energy consumption parameter in response to the vehicle traveling a distance exceeding a threshold distance, which in some embodiments may be 0.1 km.

Embodiments according to the present disclosure provide a number of advantages. For example, the present disclosure provides an accurate estimation of vehicle range. Methods according to the present disclosure provide responsive recalculations based on changes in driving patterns. In addition, methods according to the present disclosure provide reduced computing requirements relative to known methods.

The above and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a vehicle, whether a battery electric vehicle (BEV), hybrid electric vehicle (HEV), or conventional vehicle powered solely by an internal combustion engine, the energy consumption rate is monitored and learned for a variety of end use features. Various examples include an instantaneous energy consumption rate display, an average consumption rate over the trip odometer, a running average consumption rate for the current drive cycle, and a distance to empty calculation. As a general concern it is important for such calculations to be accurate.

Figure 1:
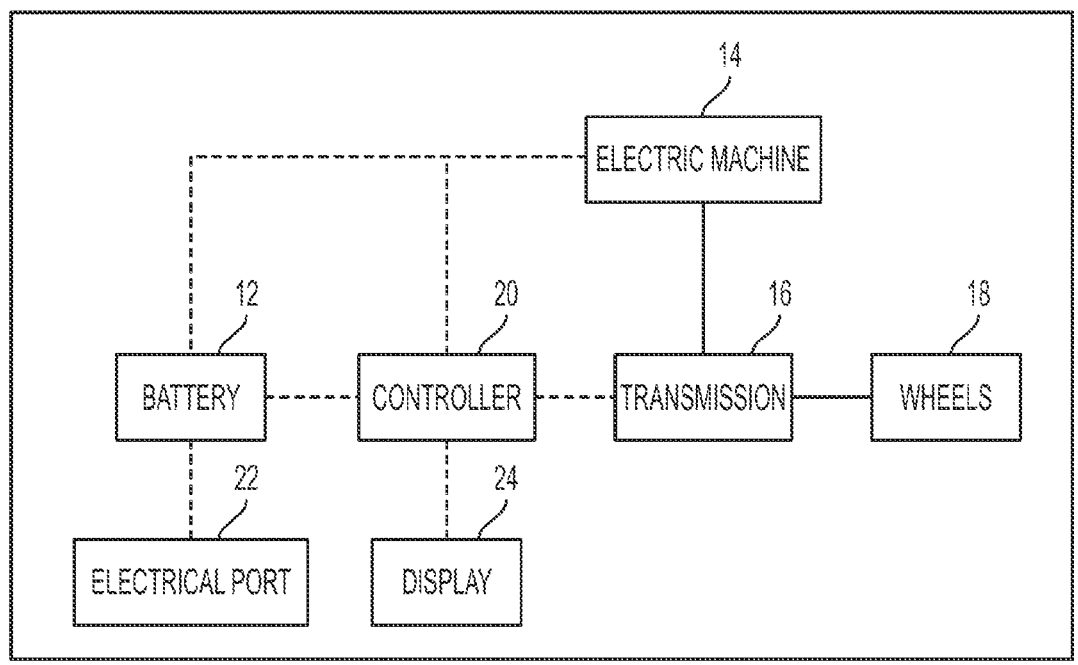
FIG. 1 is a block diagram of a battery electric vehicle.

Referring now to FIG. 1, an embodiment of a BEV 10 is illustrated in schematic form. The BEV 10 includes a battery 12 and electric machine 14. The BEV 10 also includes a transmission 16, traction wheels 18, one or more controllers 20, an electrical port 22, and a display/interface 24. The display/interface 24 may include a screen, speakers, a push button, or various other user interface elements. The electric machine 14 and wheels 18 are mechanically connected with the transmission 16 (as indicated by solid lines) in any suitable/known fashion such that the electric machine 14 may drive the wheels 18, and the wheels 18 may drive the electric machine 14. Other arrangements are also possible. The battery 12 may provide energy to or receive energy from the electric machine 14. The battery 12 may also receive energy from a utility grid or other off-board power source (not shown) via the electrical port 22. The one or more controllers 20 are in communication with and/or control the battery 12, electric machine 14, transmission 16 and display/interface 24 (as indicated by the dashed lines).

In a BEV, it is especially important to accurately calculate the vehicle range or distance to empty ("DTE"). BEVs generally have shorter range than conventional vehicles, and as such BEV operators are highly reliant on the vehicle range calculation to ensure that the destination is within vehicle range.

In a conventional vehicle, vehicle range is generally calculated based on stored bins of historical vehicle range, each bin being individually calculated based on fuel consumption over a fixed distance, to produce an average vehicle range.

Figure 2:
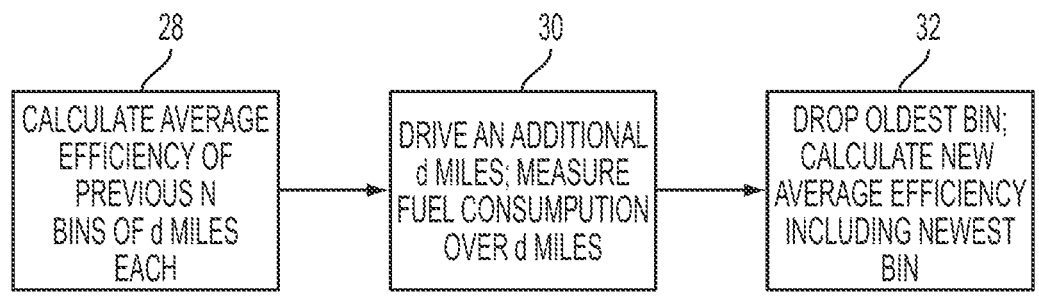
FIG. 2 is a flowchart depicting a prior art method for calculating vehicle energy consumption rates.

An example of such a prior art calculation is illustrated in FIG. 2. An average efficiency is calculated based on a previous N bins, as illustrated at block 28. Each of the bins $b_1, b_2 \ldots b_N$ includes a fuel consumption or fuel efficiency value for a vehicle travel interval of d miles. As an example, N may be 6, and d may be 60. In such an example, the efficiency would thus be averaged over a total of 360 miles driven. The vehicle subsequently drives an additional d miles, as illustrated at block 30. The fuel consumed over the d miles is measured, and a fuel efficiency is calculated for the new bin $b_{N+1}$. The oldest bin is then dropped, as illustrated at block 32. A new efficiency is then calculated using an average of $b_2, b_3 \ldots b_{N+1}$.

The technique, however, may be less accurate during transient driving events, such as a transition from city to highway driving. Additionally, conventional range calculations generally assume that the available energy from remaining fuel is a constant, regardless of temperature or age. However, the energy available from a BEV battery for a given state of charge may vary based on battery temperature and age. Furthermore, cabin heating and cooling generally have more substantial and variable impacts on energy consumption in a BEV than they do in a conventional vehicle.

One solution to better account for transient events is to use a larger number of small bins, such that changes in energy efficiency due to driving behavior are captured sooner. However, this may become relatively memory-intensive due to the requirement of storing a large number of bins.

An alternative method of calculating DTE involves estimating a fuel efficiency based on a learned average vehicle speed and a learned average power consumption. However, it should be noted that learning in the time domain, for example, can result in an estimate which is biased toward the energy consumption rate at low speeds. Preferably, a DTE calculation for a BEV accounts for transient driving events without introducing mis-estimation by operating in the time domain. To construct an unbiased estimator or a rate based quantity, the filter update domain preferably matches the domain of the denominator variable. Since the desired energy consumption rate is defined by the ratio of energy to distance, the filtering should be performed in the distance domain.

Figure 3:
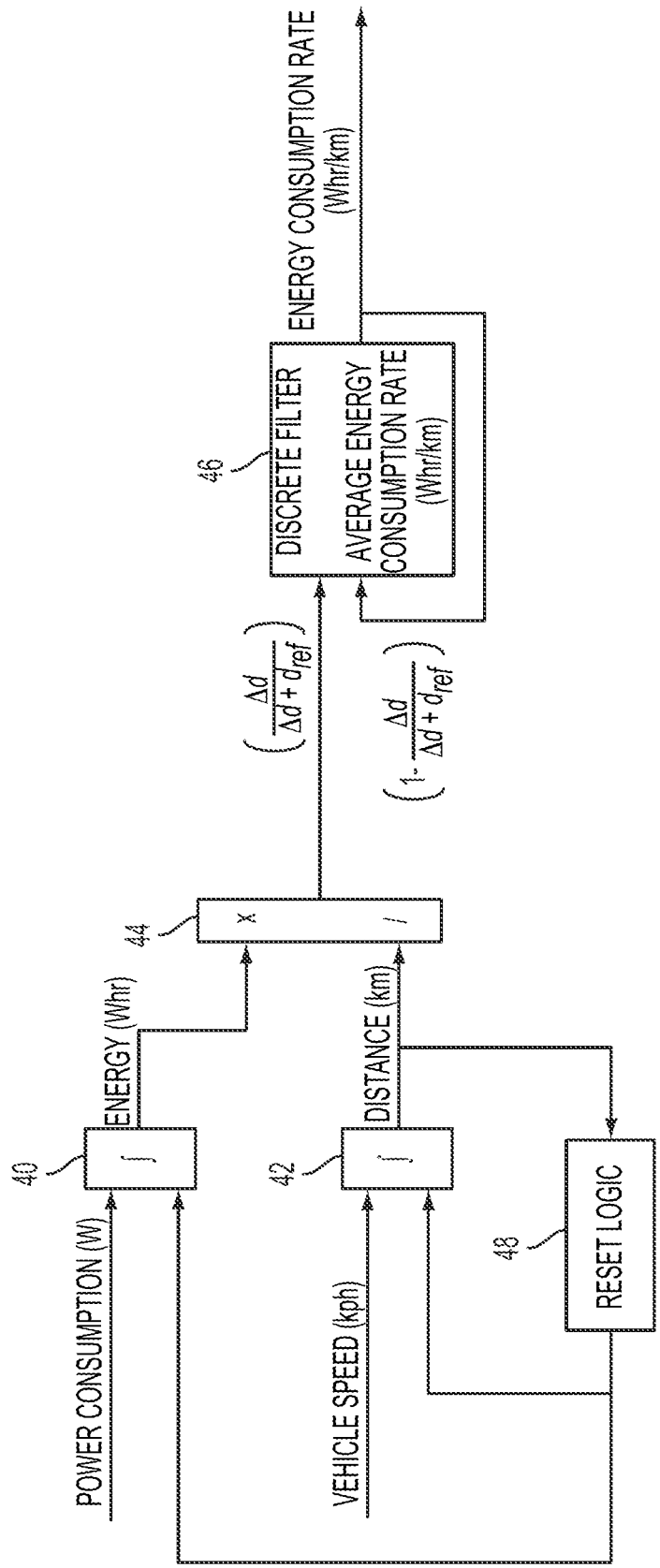
FIG. 3 is a block diagram illustrating a method for calculating vehicle energy consumption rates.

Referring now to FIG. 3, a preferred embodiment of a DTE calculation for a BEV is illustrated in block diagram form. Power consumption is integrated for a given sample interval to obtain the energy used in Whr, as illustrated at block 40. In one embodiment, this calculation is according to the algorithm:

$$E_{consumed}(k) = E_{consumed}(k-1) + P(k)\Delta t,$$

where $E_{consumed}$ is the energy consumed since the previous integrator reset, P is the total power consumption, k is the discrete time index, and $\Delta t$ is the sampling time.

Similarly, the vehicle speed is integrated for the sample interval to obtain a distance in km, as illustrated at block 42. This may be embodied as:

$$d_{traveled}(k) = d_{traveled}(k-1) + v(k)\Delta t$$

where $d_{traveled}$ is the distance traveled since the most recent integrator reset, and v is the vehicle speed.

The energy calculated at operation 40 is divided by the distance calculated at operation 42 to calculate an energy consumption rate in Whr/km for the sample interval, as illustrated in block 44.

The energy consumption rate calculated at operation 46 is passed through a discrete filter, as illustrated at block 48. The filter 48 is configured to calculate an average energy consumption rate in the distance domain. The filter 48 is provided with a distance threshold $d_{threshold}$, such that if the distance traveled since an integrator reset is greater than or equal to the distance threshold, then the energy consumption rate is updated; otherwise the energy consumption rate remains constant. As a nonlimiting example, the distance threshold may be set at 0.1 km. Other appropriate thresholds may of course be used.

In an embodiment including a first order discrete filter, the energy consumption rate may be obtained by:

$$r(k) = \begin{cases} (1 - \alpha_d(k))r(k-1) + \alpha_d(k)r_{input}(k) & \text{if } d_{traveled} \geq d_{threshold} \\ r(k-1) & \text{otherwise} \end{cases},$$

where $$\alpha_d(k) = \frac{d_{traveled}(k)}{d_{threshold}(k) + d_{ref}},$$

$$r_{input}(k) = \frac{E_{consumed}(k)}{d_{traveled}(k)},$$

r is a learned energy consumption rate, $r_{input}$ is the energy consumption rate of the current interval, $d_{threshold}$ is the distance threshold, $a_d$ is the filter constant and $d_{ref}$ is reference distance which defines a rate at which energy consumption is learned.

Additionally, if the distance traveled since the last integrator reset is greater than or equal to the defined distance threshold, then both the distance traveled and energy consumption integrals should be reset (i.e. set to zero). The integrators 40 and 42 are thus reset, as illustrated at block 44.

The value of the reference distance, $d_{ref}$, may be calibrated based upon a desired bias toward more recent energy consumption rates. As an example, the reference distance may be set at 50 km. In this example filter, the filter will learn 63.2% of a step change in energy consumption after 50 km. The filter will learn 95% of the energy consumption change after 150 km. Other values of $d_{ref}$ will result in faster or slower learning rates.

In various embodiments, the reference distance may be calibrated according to a desired metric. For example, an instantaneous energy consumption rate may be obtained by setting the reference distance equal to the distance threshold. As another example, a long term energy consumption rate may use a reference distance of 100 kilometers. Such an example may be desirable for calculating DTE. In some embodiments, multiple embodiments according to the present disclosure may be implemented at the same time using different reference distances. Such embodiments are thus capable of calculating and displaying multiple fuel consumption metrics simultaneously.

Furthermore, once the energy consumption rate has been learned, the energy consumption efficiency may be calculated by taking the inverse of the learned energy consumption rate.

The above algorithm is computationally efficient, accurately tracks changes in energy consumption, performs consistently regardless of the speed of the vehicle, and produces a continuous energy consumption estimate as opposed to the discontinuous average generated by the prior art method.

In addition, the proposed approach is significantly leaner in terms of memory storage requirements relative to prior art methods. The learned value of the filtered energy consumption may be stored in memory and carried over from key cycle to key cycle. However, the values of the distance and energy integrals do not need to be retained. Since the distance integrals are preferably reset frequently in response to a short distance threshold, an insignificant amount of information is lost by resetting the integrals each key cycle. The memory requirements are therefore substantially less than prior art methods which required storing multiple parameters for each of multiple bins.

Variations of the above algorithm may be used to calculate a variety of energy consumption metrics of interest to a vehicle operator. Such metrics include, but are not limited to: instantaneous energy consumption, average consumption rate over the trip odometer, a running average consumption rate for a current drive cycle, a lifetime average consumption rate for the vehicle, and a DTE estimation.

In a variation, the algorithm may suspend learning the fuel consumption rate under certain conditions. For example, if the vehicle is driving down a steep grade, it is undesirable for the energy consumption rate of the vehicle to reflect the current driving situation, as the energy usage during that portion of a drive cycle is atypically low and not representative of energy usage during normal driving conditions. In such a situation, the distance and energy integrals can be reset and held at zero until normal driving conditions are resumed. Similarly, the fuel consumption rate learning may be suspended under other conditions in which a current energy usage is not representative of normal driving conditions. After the vehicle has exited the atypical driving situation, the fuel consumption learning may be resumed.

Figure 4:
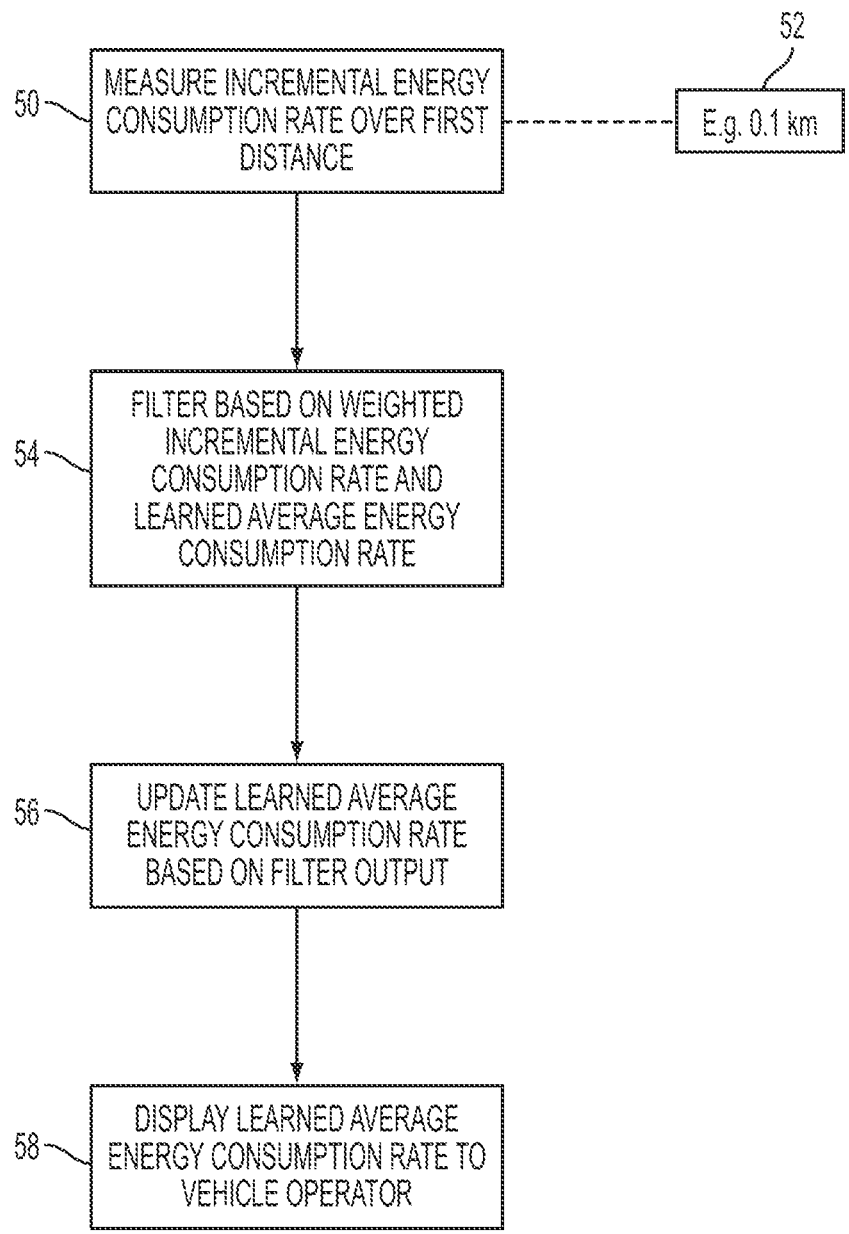
FIG. 4 is a flowchart depicting a method for controlling a vehicle.

Referring now to FIG. 4, a method for controlling a vehicle according to the present disclosure is illustrated in flowchart form. An incremental energy consumption rate is measured over a first distance, as illustrated at block 50. The first distance may be 0.1 km, as illustrated at block 52. A filter is run based on the incremental energy consumption rate, weighted by a weighting factor, and additionally based on a learned average energy consumption rate, as illustrated at block 54. The learned average energy consumption rate is then updated based on the filter output, as illustrated at block 56. The learned average energy consumption rate is displayed to a vehicle operator, as illustrated at block 58.

While the above method has been described largely with respect to BEVs, the method is not limited to purely electric vehicles. Embodiments according to the present disclosure may also be used in conjunction with HEVs, plug-in hybrid electric vehicles (PHEVs), and conventional vehicles.

As can be seen from the various embodiments, the present invention provides an accurate estimation of vehicle range that is responsive to transient changes in driving patterns. In addition, methods according to the present disclosure provide reduced computing requirements relative to known methods.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method of controlling a battery electric vehicle comprising:
supplying power from a vehicle battery; and
displaying, to a vehicle operator, an energy consumption parameter that is based on a filtered energy usage rate in which an incremental energy consumption rate measured over a first distance is input to a distance-domain filter and weighted with a factor based on the first distance and a reference distance that is greater than the first distance.

2. The method of claim 1, wherein the filter is a first order discrete filter.

3. The method of claim 1, wherein the incremental energy consumption rate is based on a time integral of power consumed over the first distance and a time integral of average vehicle speed over the first distance.

4. The method of claim 1, further comprising resetting the incremental energy consumption rate in response to the vehicle traveling a distance exceeding the first distance.

5. A vehicle comprising:
a battery;
a display configured to signal information to a vehicle operator; and
a controller configured to signal a vehicle energy consumption rate via the display, and programmed to output the vehicle energy consumption rate based on distance-domain filtering an incremental energy consumption rate measured over a first distance with a weighting factor based on the first distance and a reference distance that is greater than the first distance.

6. The vehicle of claim 5, further comprising a traction motor configured to provide torque to vehicle traction wheels.

7. The vehicle of claim 5, wherein the vehicle energy consumption rate is filtered by a first order discrete filter.

8. The vehicle of claim 5, wherein the controller is further configured to reset the incremental energy consumption rate in response to the vehicle traveling a distance exceeding the first distance.

9. The vehicle of claim 8, wherein the first distance is 0.1 km.

10. A method of controlling a vehicle comprising:
transferring power between a traction battery and a traction motor; and
displaying, to a vehicle operator, a vehicle energy consumption parameter that is based on a weighted function of a first energy consumption value and a second energy consumption value, the first energy consumption value corresponding to an incremental energy consumption rate over a first distance and the second energy consumption value corresponding to a stored energy consumption rate over an accumulated distance, and the filter having weighting factors based on the first distance and a reference distance, wherein the weighted function is a first-order distance-domain filter.

11. The method of claim 10, wherein the vehicle energy consumption parameter is an estimated distance to empty.

12. The method of claim 10, wherein the vehicle energy consumption parameter is filtered by a first order discrete filter.

13. The method of claim 10, further comprising resetting the incremental energy consumption rate in response to the vehicle traveling a distance exceeding the first distance.

14. The method of claim 13, wherein the first distance is 0.1 km.

* * * * *